United States Patent [19]
Carlin et al.

[11] 3,865,187
[45] Feb. 11, 1975

[54] OIL RECOVERY PROCESS USING SURFACTANT MIXTURES

[75] Inventors: Joseph T. Carlin; Richardo L. Cardenas, both of Houston, Tex.

[73] Assignee: Texaco Inc., New York, N.Y.

[22] Filed: Feb. 6, 1974

[21] Appl. No.: 440,095

[52] U.S. Cl. .................................................. 166/273
[51] Int. Cl. ............................................. E21b 43/22
[58] Field of Search .......... 166/273, 274, 275, 270; 252/8.55 D

[56] References Cited
UNITED STATES PATENTS

| | | | |
|---|---|---|---|
| 3,174,542 | 3/1965 | Reisberg | 166/270 |
| 3,330,345 | 7/1967 | Henderson et al. | 166/273 |
| 3,358,757 | 12/1967 | Holmes | 166/270 |
| 3,373,809 | 3/1968 | Cooke, Jr. | 166/273 |
| 3,491,834 | 1/1970 | Ahearn et al. | 166/273 |
| 3,616,853 | 11/1971 | Ayers, Jr. | 166/273 |
| 3,796,266 | 3/1974 | Carlin et al. | 166/273 X |

*Primary Examiner*—Stephen J. Novosad
*Attorney, Agent, or Firm*—Thomas H. Whaley; C. G. Ries

[57] ABSTRACT

Recovery of hydrocarbons from underground hydrocarbon-bearing formations is effected by the injection of a slug of a hydrocarbon solvent containing a monounsaturated secondary alcohol followed by water containing a sulfate salt of a fatty alcohol. Optionally, a slug of water or brine may be injected prior to the injection of the slug containing the sulfate salt of a fatty alcohol.

18 Claims, 5 Drawing Figures

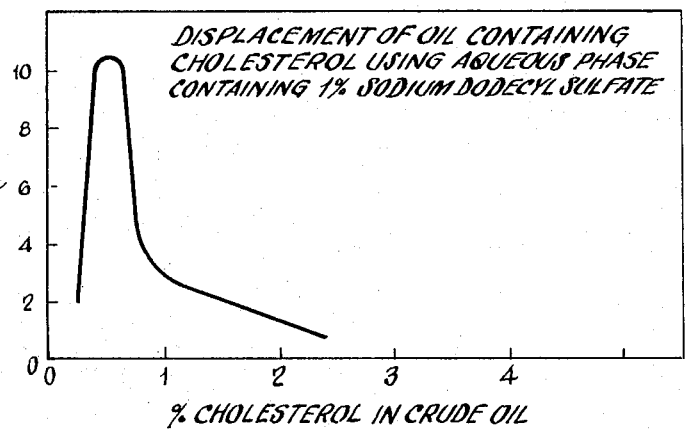
Fig. 1. Displacement of oil containing cholesterol using aqueous phase containing 1% sodium dodecyl sulfate
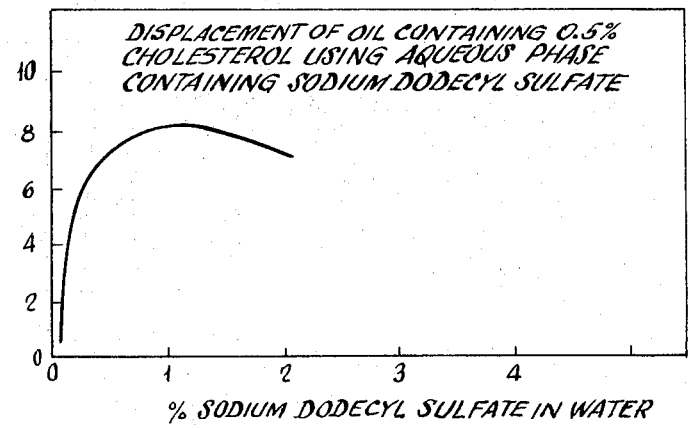
Fig. 2. Displacement of oil containing 0.5% cholesterol using aqueous phase containing sodium dodecyl sulfate
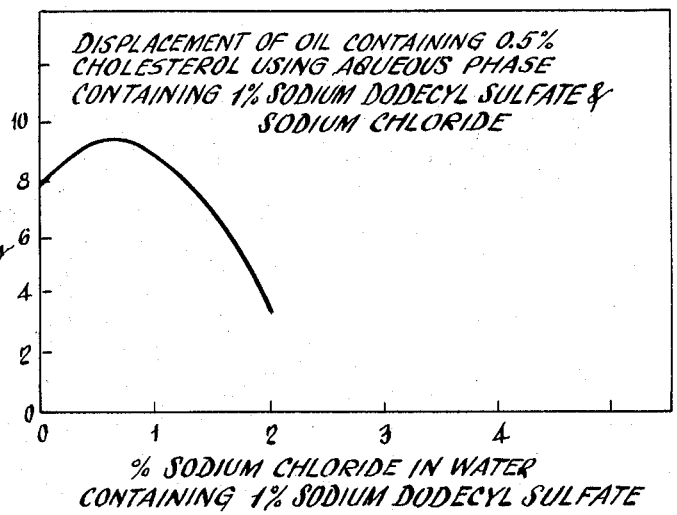
Fig. 3. Displacement of oil containing 0.5% cholesterol using aqueous phase containing 1% sodium dodecyl sulfate & sodium chloride

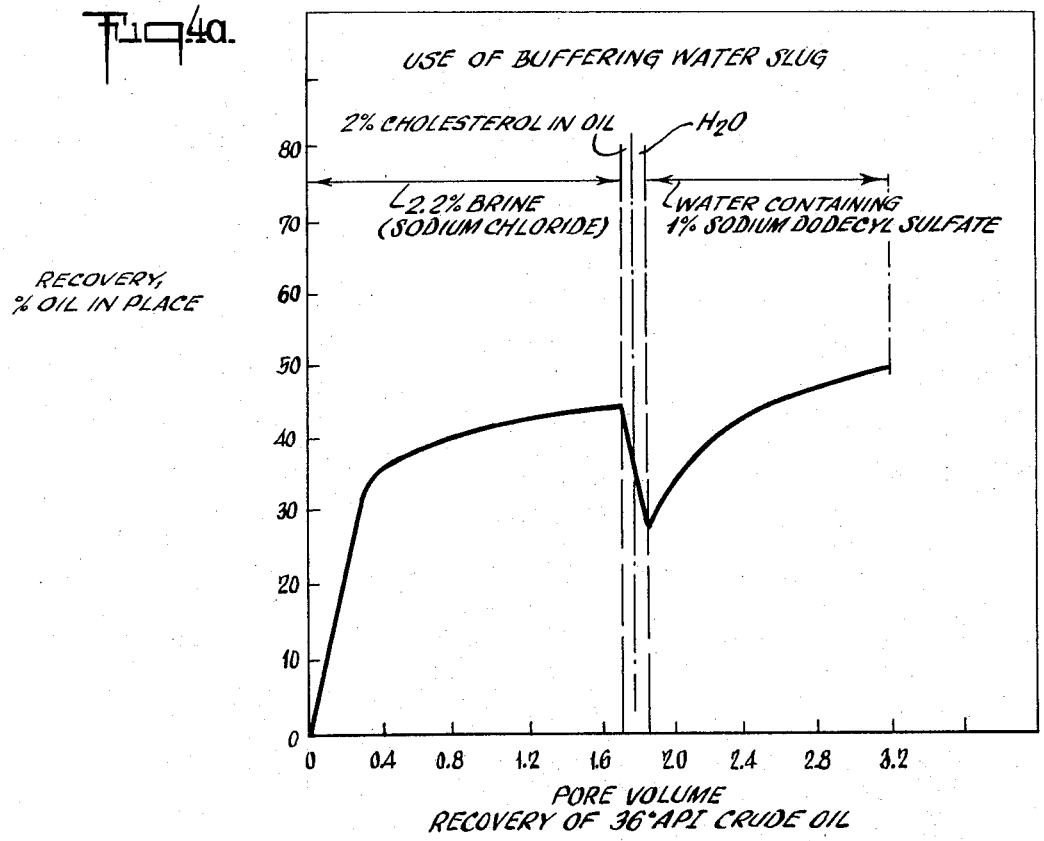
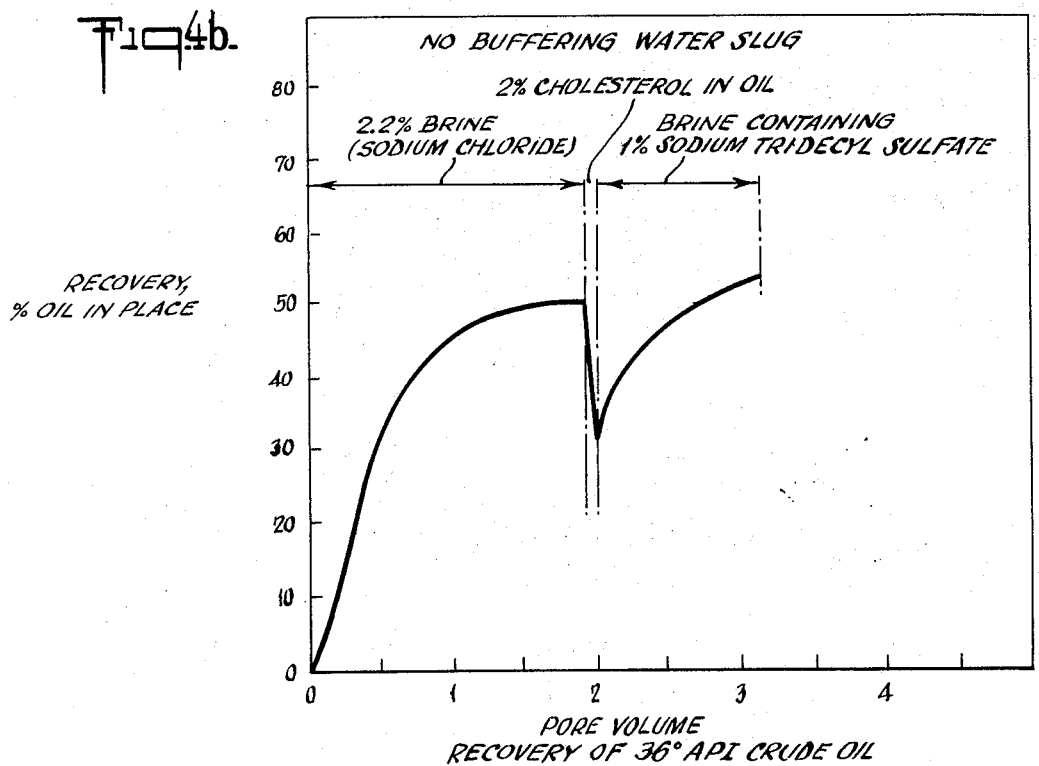

OIL RECOVERY PROCESS USING SURFACTANT MIXTURES

FIELD OF THE INVENTION

This invention relates to a secondary or tertiary recovery process for the recovery of hydrocarbons from a subterranean hydrocarbon-bearing formation. More particularly, the invention pertains to an improved process in which a slug of a hydrocarbon solvent containing a mono-unsaturated secondary alcohol is injected into the formation, followed by the injection of an aqueous brine solution containing a sulfate salt of a fatty alcohol.

DESCRIPTION OF THE PRIOR ART

Primary production of oil from subterranean oil-bearing formations is normally obtained by exploiting the natural energy of the reservoir in the form of water drive, gas cap drive, solution gas drive and combinations thereof. It is well-known that these "primary recovery" techniques leave substantial amounts of oil in the reservoir. This oil remaining in the reservoir after primary energy sources have been depleted may be partially recovered by secondary recovery methods. One of the more common secondary methods is waterflooding. In this method, flooding water is injected into the reservoir through one or more injection wells traversing the oil-bearing formation. The water displaces the oil in the formation and moves it through the formation toward one or more production wells from which the oil is produced.

However, this secondary method may only recover up to 30–50% of the remaining oil in place, thus leaving considerable quantities of oil behind. It is believed that this recovery factor is due among other things to the existence of high interfacial tensions between the boundary of the water and oil, which seriously hinders the efficiency of the displacement process.

At the completion of a water flood substantial oil remains unrecovered in the reservoir. If the crude contains natural emulsifiers, additional crude can be recovered by the injection of an alkaline water. Other methods known in the art are to inject a slug of oil containing an emulsifier and thereafter injecting alkaline water. The formation, however, of an emulsion in the reservoir is retarded by the presence of salts such as sodium chloride, thereby greatly limiting the use of the emulsion type process to reservoirs with fresh water or water with low brine concentrations.

It is well known that the efficiency of waterflooding may be improved by the use of surfactants in the flood water. These aqueous surfactant systems effect improved recovery by decreasing the interfacial tension between the oil and the water phases. Generally, the lower interfacial tension the greater the oil recovery.

Minimum surface interfacial tension between an aqueous phase and an oil phase can be determined as has been described in the prior art by delineating the salinity concentration, surfactant composition and surfactant concentration for a particular reservoir.

Although the surfactant systems that have been described in the prior art are effective, their beneficial effects tend to be reduced when polyvalent metal ions are present in the reservoir. In addition, the surfactant materials used tend to be adsorbed on the matrix to the extent that it is disadvantageous.

In the process of using surfactants generally the method involves injecting a solution of the surfactant which may contain a known quantity of monovalent salt and thereafter injecting a displacing agent to displace the surfactant slug through the reservoir. The displacing agent may contain a thickener such as a polyacrylamide. One such thickener is commercially available as Dow 700, manufactured by the Dow Chemical Company.

It is known that some crude oils that contain natural emulsifiers emulsify spontaneously on contact with alkaline water. Crude, without these emulsifiers, does not emulsify in the presence of alkaline water, but if fatty acids are added thereto the mixture will spontaneously emulsify with alkaline water, the emulsifying agent being the soap formed at the interface. However, it is known that brine present in the formation will inhibit the emulsification.

We have found that the emulsification of crude oils in the presence of briny water can be effected by injecting a slug containing a mono-unsaturated secondary alcohol such as cholesterol and thereafter injecting a brine solution containing a sulfate salt of a fatty alcohol such as sodium dodecyl sulfate.

SUMMARY OF THE INVENTION

This invention relates to the secondary or tertiary recovery of hydrocarbons whereby a hydrocarbon solvent containing a mono-unsaturated secondary alcohol is injected into the hydrocarbon-bearing formation and thereafter an aqueous drive fluid containing a sulfate salt of a fatty alcohol is injected to displace the hydrocarbon slug and the formation hydrocarbon through the formation to a production well from which the hydrocarbons are produced.

BRIEF DESCRIPTION OF THE DRAWINGS

FIG. 1 illustrates the effect of cholesterol on the displacement of oil.

FIG. 2 illustrates the effect of sodium dodecyl sulfate on the displacement of oil.

FIG. 3 illustrates the effect of sodium chloride on the displacement of oil.

FIGS. 4a and 4b each illustrate production history using cholesterol and a sulfate salt of fatty alcohol.

DESCRIPTION OF THE PREFERRED EMBODIMENT

This invention is based upon the fact that crude oils can be made to emulsify by the injection of a mono-unsaturated secondary alcohol such as cholesterol which is thereafter contacted by an aqueous solution containing a sulfate salt of a fatty alcohol which mixtures spontaneously emulsify upon contact.

In the method of the invention a hydrocarbon slug having a predetermined concentration of a mono-unsaturated secondary alcohol such as cholesterol is injected into the reservoir followed by a saline aqueous displacing agent containing a sulfate salt of a fatty alcohol.

The invention can be illustrated by a series of laboratory tests on capillary displacements that were conducted using cholesterol as the mono-unsaturated secondary alcohol dissolved in the hydrocarbon oil phase and sodium dodecyl sulfate as the sulfate salt of a fatty alcohol dissolved in the aqueous phase. Glass capillaries were filled with the oil phase, which was a 36° API crude containing cholesterol in about 2%, after which the capillaries were submerged in the aqueous phase having the composition as shown by the aqueous slug containing the sulfate and an alkali salt.

Under test, the difference in the densities of the oil in the tube and the aqueous solution surrounding the tube served as a displacement mechanism that was counteracted upon by the interfacial tension between the oil and the aqueous solution. Displacement of the oil phase from the capillary was observed through a microscope by viewing the oil-water meniscus as it moved down the capillary. The distance, in millimeters, travelled by the meniscus in 5 minutes time was recorded and taken as a measure of the displacement effectiveness of the mixture under test. This displacement distance is plotted in FIGS. 1 through 3 against the percent of material whose concentration is being studied. As a comparison, essentially no movement occurred where the water contained no additive.

FIG. 1 shows displacement of the crude wherein the concentration of the mono-unsaturated alcohol, cholesterol, was varied using optimum concentration of surfactant, i.e., 1% sodium dodecyl sulfate from FIG. 1. The results show that the greatest distance travelled by the meniscus occurred at a concentration of 0.5%

FIG. 2 illustrates the displacement by an aqueous solution containing sodium dodecyl sulfate in varying concentrations. The results show that at a concentration of 1% of the sulfate salt of the fatty alcohol, maximum displacement occurred.

FIG. 3 illustrates the effect on displacement of varying the concentration of the soluble alkali salt in the aqueous solution containing 1% sodium dodecyl sulfate. The results show that the greatest displacement occurred when the concentration of the sodium chloride was about 0.5%.

Using the optimum compositions that have been described above, two linear displacement floods were performed employing a crude having a gravity of 36° API. The production history of these floods is shown graphically in FIGS. 4a and b.

FIG. 4a shows the result of injecting a slug of 2% cholesterol dissolved in crude oil followed by a buffering water slug followed by water containing 1% sodium dodecyl sulfate. The buffering slug served to drive the oil slug further into the core and also allowed the cholesterol to disperse into the in-place oil before contacting the surfactant solution.

FIG. 4b shows the result of using a different surfactant, i.e., sodium tridecyl sulfate without a buffering water slug. The results showed additional oil recovery occurred in both by the use of a slug of cholesterol and the crude.

A wide variety of mono-unsaturated secondary alcohols may be used. For example, the mono-unsaturated secondary alcohol may be a substituted cyclic secondary alcohol such as cyclohexenol and its alkyl derivatives, such as methylcyclohexenol, propylcyclohexenol and pentacyclohexenol. In addition, the alcohol may be a dialkyl derivative such as dimethylcyclohexenol or trialkyl derivatives of cyclohexenol.

A second group of alcohols suitable for practicing this invention are the terpene alcohols which are alcohols derived from simple terpene hydrocarbons such a pulegol, isoborneol, menthol and piperitol.

A third group of alcohols that are suitable are the mono-unsaturated secondary alcohols having a condensed ring structure such as a polyalicyclic alcohol, one of which is cholesterol.

The solvent medium containing the said secondary alcohol may be any hydrocarbon that is a solvent for the secondary alcohols such as butane, propane or other hydrocarbons. In some instances the crude itself may serve as the solvent medium.

A wide variety of the sulfate salt of a fatty alcohol may be employed. Such water soluble salts of an aliphatic substituted anionic surfactant having from 8 to 20 carbon atoms per molecule, and in which the cation is sodium, potassium or ammonium, are suitable. Typical examples are sodium tridecyl sulfate or sodium dodecyl sulfate.

The soluble alkali metal salt may be any soluble inorganic salt of sodium, potassium or ammonium. The preferred salt is sodium chloride that is commonly available.

In its broadest aspect this invention relates to a process for recovering oil from an oil bearing reservoir having at least one injection well and at least one production well which comprises:

1. injecting into the formation a slug of hydrocarbon solvent containing a mono-unsaturated secondary alcohol,
2. optionally, thereafter, injecting a slug of water or brine,
3. injecting an aqueous slug containing a sulfate salt of a fatty alcohol and a soluble alkali metal inorganic salt,
4. recovering oil from the production well.

In a preferred embodiment of the invention, a mixture of a mono-unsaturated secondary alcohol in a solvent such as butane, propane or other hydrocarbons, or, under some conditions, with the produced crude itself, is prepared. A first slug of this mixture is injected into the formation. Optionally, this slug injection is followed by the injection of a slug of water or brine. Thereafter, a second slug of an aqueous solution containing a sulfate salt of a fatty alcohol such as sodium dodecyl sulfate and a water soluble alkali metal salt such as sodium chloride is injected. The second slug displaces the preceding slug(s) through the formation, and also the hydrocarbon contained in the formation, toward a producing well from which the formation hydrocarbons are produced. The aqueous slug may be followed by a waterflood.

In practicing the invention it is recommended that the slug containing the mono-unsaturated secondary alcohol be injected in an amount of from about 5% to about 50% of the reservoir pore volume. It is preferred that the slug contain the secondary alcohol in amounts from about 0.1% by weight to about 10% by weight.

The first slug thereafter may be followed, optionally by an aqueous slug or a slug of brine having a concentration of salt from about 0.1% by weight to about 5.0% by weight. The size of this slug may vary from about 5% to about 50% reservoir pore volume.

Thereafter the aqueous slug containing the sulfate salt of a fatty alcohol and a soluble alkali metal salt is injected in an amount from about 5% to about 50% of the reservoir pore volume. It is preferred that the concentration of the sulfate salt of the fatty acid be in amounts from about 0.1% by weight to about 2.0% by weight. The concentration of the alkali metal salt should be in the range of from about 0.1% to about 5.0% by weight.

In yet another variation, this aqueous slug may be continued as the effective drive agent. However, it is preferred to follow this slug by a waterflood. The flooding water may be brine, thickened water or thickened brine. The thickening agent to be employed may be, for example, Dow Pusher 500, manufactured by the Dow Chemical Co. The thickener may be employed in the amount of from about 0.01 to about 0.5% by weight.

The method of invention may employ a conventional 5-spot type pattern wherein the central well is the injector and the four offset wells are the producers. Alternately, a conventional line drive may be employed with one line serving as injector wells and the two adjacent lines serving as producing wells.

We claim:

1. A method of recovering hydrocarbons from a subterranean hydrocarbon-bearing formation traversed by at least one injection well and one production well comprising the steps of:
   a. injecting into said formation via said injection well a first slug of hydrocarbon solvent containing a mono-unsaturated secondary alcohol,
   b. injecting said formation a second slug of an aqueous medium containing a sulfate salt of a fatty alcohol, said sulfate salt having from 8-20 carbon atoms per molecule, and said aqueous slug also containing a water soluble alkali metal salt,
   c. injecting water or brine as a drive agent sufficient to drive said slugs and said hydrocarbons through said formation toward said production well,
   d. recovering said hydrocarbons from said production well.

2. The method of claim 1 wherein said first slug containing said mono-unsaturated secondary alcohol is injected in amounts from about 5% to about 50% of the reservoir pore volume.

3. The method of claim 1 wherein said mono-unsaturated secondary alcohol is a mono-unsaturated cyclic secondary alcohol, alkyl derivatives of said cyclic secondary alcohols, terpene alcohols and derivatives thereof and polyalicyclic alcohols and derivatives thereof.

4. The method of claim 3 wherein said mono-unsaturated secondary alcohol is cholesterol, derivatives of cholesterol and mixtures thereof.

5. The method of claim 1 wherein said mono-unsaturated secondary alcohol is present in said first slug in a concentration from about 0.1% to about 10% by weight.

6. The method of claim 1 wherein said hydrocarbon solvent containing said mono-unsaturated secondary alcohol is a hydrocarbon having from 2 to 6 carbon atoms per molecule and mixtures thereof.

7. The method of claim 6 wherein said hydrocarbon solvent is propane, butane or mixtures thereof.

8. The method of claim 6 wherein said hydrocarbon solvent is a crude oil.

9. The method of claim 8 wherein said sulfate salt is sodium dodecylsulfate.

10. The method of claim 8 wherein said sulfate salt is sodium tridecyl sulfate.

11. The method of claim 10 wherein said alkali metal salt is sodium chloride.

12. The method of claim 1 wherein said second slug containing said sulfate salt of a fatty alcohol is injected in amounts from about 5% to about 50% of the reservoir pore volume.

13. The method of claim 1 wherein said sulfate salt of said fatty alcohol is the sodium, potassium or ammonium salt of said alcohol.

14. The method of claim 1 wherein said sulfate salt is present in said second slug in a concentration from about 0.1% to about 2.0% by weight.

15. The method of claim 1 wherein said alkali metal salt in said second slug is a water soluble inorganic salt of sodium, potassium or ammonium.

16. The method of claim 1 wherein said alkali metal salt in said second slug is present in amounts from about 0.1% to about 5.0% by weight.

17. The method of claim 1 wherein said water or brine drive agent contains a thickening agent.

18. The method of claim 1 wherein step (b) is preceded by the injection of a slug of water, brine, thickened water or thickened brine.

* * * * *

UNITED STATES PATENT AND TRADEMARK OFFICE
CERTIFICATE OF CORRECTION

PATENT NO. : 3,865,187

DATED : February 11, 1975

INVENTOR(S) : JOSEPH T. CARLIN and RICHARDO L. CARDENAS

It is certified that error appears in the above-identified patent and that said Letters Patent are hereby corrected as shown below:

Claim 8, line 1
    delete "6" and insert --1--

Claim 9, line 1
    delete "8" and insert --13--

Claim 10, line 1
    delete "8" and insert --13--

Claim 11, line 1
    delete "10" and insert --15--

Signed and Sealed this twenty-third Day of December 1975

[SEAL]

Attest:

RUTH C. MASON
Attesting Officer

C. MARSHALL DANN
Commissioner of Patents and Trademarks